United States Patent Office 3,582,516
Patented June 1, 1971

---

3,582,516
EPOXY RESINS FROM ALKYLATED PHENOL NOVOLAC RESINS
John R. LeBlanc, Wilbraham, Mass., assignor to Monsanto Company, St. Louis, Mo.
No Drawing. Filed Mar. 20, 1969, Ser. No. 809,023
Int. Cl. C08g 5/08, 5/18
U.S. Cl. 260—33.6                    10 Claims

ABSTRACT OF THE DISCLOSURE

Improved epoxy novolac resins produced by first reacting epichlorohydrin with an alkylated phenol aldehyde novolac resin wherein said alkylate is a specific mixture of cyclopentadiene codimer compounds, and thereafter dehydrohalogenating the resulting product.

BACKGROUND OF THE INVENTION

Epoxy resins are well known in the art, particularly those obtained from etherification of phenol formaldehyde starting material condensates by etherification with halo epoxy alkanes such as epichlorohydrin. Such resins are described, for instance, in Belgian patent specification 503,549. When the starting material condensates are prepared from phenol and formaldehyde, the resulting epoxy novolac resins have several disadvantages which have resulted in a reduction of the desirable broad spectrum utility of said resins as well as certain disadvantages in connection with their method of preparation. A definite need exists today for an improved epoxy novolac resin which when cured has good physical strength properties and which can be easily manufactured from readily available and relatively inexpensive starting materials.

It has been found not only that epoxy derivatives of novolac resins prepared from pure phenol and aldehyde characteristically lack solubility in cheap paraffinic hydrocarbons of the type available from the petroleum industry, but also that the high cost of special solvents needed in preparation and in certain applications of these prior epoxy novolac resins has prevented many commercial uses thereof. Furthermore, these prior pure epoxy novolacs tend to be somewhat brittle after curing, thereby making them unsuitable for use in many applications requiring versatile impact and flexural properties, such as binders for structural laminates and abrasives.

In an effort to improve the properties of epoxy novolac resins, it has heretofore been suggested that one may use as starting novolacs those which are alkylated or even arylated with an unsaturated aliphatic compound, a cycloaliphatic compound, or a vinylidene aromatic compound. Such alkylation or arylation may take place either before or after condensation of phenol with aldehyde, but always before reaction of novolac with halo epoxy alkane. Such suggestions do sometimes and to a degree improve properties of product epoxy novolac resins, but these improvements appear to be always limited by the fact that the product epoxy resins are derived from starting novolacs which have been substituted on the phenol ring with only a single pure organic compound. In any event, an epoxy novolac resin which is soluble in a wide variety of organic solvents, exhibits upon curing good physical strength characteristics, and can be easily manufactured from readily available and relatively inexpensive starting materials, has yet to be realized.

There has now been discovered a surprisingly improved class of epoxy novolac resins which is derived from reacting a haloepoxyalkane with a member of a particular class of phenol aldehyde novolac resin starting materials. This class of starting novolac resins is characterized by the fact that the phenol portion of each novolac resin molecule has been reacted with a certain relatively low cost, well defined mixture of cyclopentadiene codimer compounds. Such substitution of the phenol portion may be made prior to, or subsequent to, the condensation of the phenol with aldehyde.

The improved epoxy novolac resins realized according to the present invention are characterized by a surprising and unexpected combination of improved properties, including their solubility in a wide variety of organic solvents, and their impact and flexural strength characteristics when thermoset. Consequently, these epoxy resins are ideally suited for use in varnish applications such as those employed to make organic structural (e.g. low void content) and electrical (e.g. low dielectric constant) laminates, as well as in a variety of inorganic bonding applications, as for instance, in making grinding wheels. In addition, the present epoxy novolac resins are easily prepared, and also are low enough in cost to be highly competitive with other polymeric materials as respects many use applications.

SUMMARY

This invention relates to improved epoxy resins derived from a particular class of substituted phenol aldehyde novolac resins wherein the phenol portion is substituted with a specific cyclopentadiene codimer compound mixture. Utilizing these alkylated novolacs as starting materials, the desired epoxy resins are prepared by reacting a halo epoxyalkane (especially epichlorohydrin) with such starting novolac resins and then dehydrohalogenating.

The starting novolac resins can be either of the so-called pre-alkylated or of the so-called post-alkylated type. In the case where a post-alkylated phenol aldehyde resin is employed as the starting material, a preformed novolac is conventionally made, as by first reacting from about 0.4 to 0.95 moles of aldehyde per mole of phenol under acid catalyzed aqueous liquid phase reaction conditions until a condensation product of the aldehyde with the phenol is produced. The methods for making such preformed novolac resins so produced are well known to those of ordinary skill in the prior art and do not constitute a part of the present invention.

The term "phenol" as used in this invention refers conventionally to an aromatic six-membered moiety which is substituted with a hydroxyl group. A preferred phenol is phenol itself.

The term "aldehyde" as used in this invention has an established meaning of scope in the art of phenolic resins and is used throughout this disclosure and claims in accordance with such established means. Thus, the term "aldehyde" has reference to hydrocarbon compounds incorporating the characteristic group:

Examples of suitable aldehydes known to the phenol-aldehyde resin art include aliphatic aldehydes, such as propionaldehyde, acetaldehyde and the like; aromatic aldehydes such as benzaldehyde and the like, cyclic aldehydes such as furfural and the like and mixtures of such. A preferred aldehyde is formaldehyde.

A preferred procedure for making a preformed novolac starting resin suitable for use in the present invention involves refluxing aldehyde (preferably formaldehyde) and phenol in the afore-indicated mole ratios under aqueous liquid phase conditions with an acidic catalytic material, such as sulphuric acid, phosphoric acid, oxalic acid, and the like for a time of from about 20 to 140 minutes. Then the mixture is dehydrated under vacuum to an end temperature of about 120–160° C. and thereafter is cooled to produce a solid product.

To make a post-alkylated novolac for use in this invention such a preformed novolac is then reacted under Friedel Crafts conditions with a mixture of cyclopentadiene codimers which comprises (when in a form substantially free of other materials wherein the sum of all component compounds of any given such mixture equals substantially 100 weight percent):

(A) From about 50 to 99 weight percent of compounds each molecule of which has:

(1) the dicyclopentadiene nucleus
(2) from 10 through 13 carbon atoms
(3) as nuclear substituents from 0 through 3 methyl groups, and (B) From about 1 to 50 weight percent of compounds each molecule of which is a codimer of cyclopentadiene with at least one acyclic conjugated alkadiene having from 4 through 6 carbon atoms per molecule.

In a preferred such mixture, a minor amount of cyclic and/or acyclic conjugated alkadiene is present, typically less than about 15 weight percent (same basis) and having 5 or 6 carbon atoms per molecule. Thus, such a mixture can comprise:

(A') From about 70 to 90 weight percent of dicyclopentadiene,
(B') From about 10 to 30 weight percent of compounds each molecule of which is a codimer of cyclopentadiene with at least one acyclic conjugated alkadiene having from 4 through 6 carbon atoms per molecule, and
(C') From about 2 to 15 weight percent of compounds each molecule of which is a cyclic and/or an acyclic conjugated alkadiene having 5 or 6 carbon atoms per molecule.

In another preferred such mixture, both a minor amount (less than about 10 weight percent-same basis) of compounds containing the indene nucleus, and a minor amount (less than about 15 weight percent-same basis) of compounds containing the phenyl vinylidene structure are present. Thus, such a mixture can comprise:

(A'') From about 1.5 to 10 weight percent of compounds each molecule of which has:

(1) the indene nucleus
(2) from 9 through 13 carbon atoms
(3) as nuclear substituents from 0 through 4 methyl groups (B'') From about 50 to 70 weight percent of compounds each molecule of which has:

(1) the dicyclopentadiene nucleus
(2) from about 10 through 13 carbon atoms
(3) as nuclear substituents from 9 through 3 methyl groups, (C'') From about 4 to 10 weight percent of compounds each molecule of which is a codimer of cyclopentadiene with at least one acyclic conjugated alkadiene having from 4 through 6 carbon atoms per molecule, and (D'') From about 4 to 30 weight percent of compounds each molecule of which has:

(1) a phenyl group substituted by a vinylidene group
(2) from 8 through 13 carbon atoms
(3) as substituents from 0 through 3 groups selected from the class consisting of methyl and ethyl.

In still another preferred such mixture, there are controlled, minor amounts (from about 2 to 9 weight percent-same basis) of each of methylcyclopentadiene and codimers of cyclopentadiene with acyclic conjugated alkadienes relative to a major amount (from about 92 to 97 weight percent-same basis) of dicyclopentadiene. Thus such a mixture can comprise:

(A''') From about 92 to 97 weight percent of dicyclopentadiene,
(B''') From about 1 to 5 weight percent of compounds each molecule of which is a codimer of cyclopentadiene with at least one acyclic conjugated alkadiene having from 4 through 6 carbon atoms per molecule, and
(C''') From about 1 to 4 weight pecent of compounds each molecule of which is a codimer of cyclopentadiene with a methylcyclopentadiene, provided that the sum of (A''') and (C''') in any given such cyclopentadiene dimer mixture is always at least about 95 weight percent, and preferably about 95 weight percent, thereof (same basis).

Preferably, such a mixture contains at least about 3 weight percent (same basis) of (B''').

Examples of suitable such acyclic conjugated alkadienes (whether or not dimerized as specified above) include butadiene (a four carbon molecule used as specified above), piperylene, isoprene, 1,3-hexadiene, 1-methyl-1,3-pentadiene, and the like.

To make a pre-alkylated novolac for use in this invention, phenol is first reacted under Friedel-Crafts conditions with the above described mixture of cyclopentadiene codimer compounds. Thereafter, the so-substituted phenol is mixed (usually gradually) with aldehyde (preferably formaldehyde). Water is added with the aldehyde. When the aldehyde is formaldehyde, water is preferred, and therefore Formalin is usually used. One employs typically 0.4 to 0.95 mol of aldehyde per mol of phenol (preferably from about 0.5 to 0.85 mol aldehyde per mole of phenol). An additional acidic catalyst material may be added, such as sulfuric acid, phosphorous acid, oxalic acid, an acid mixture, or the like, into the reaction mixture. The pH of the reaction mixture is maintained below 7.0, and, preferably, in the range from about 1 to 4. This reaction mixture is then heated to temperatures of from about 85 to 100° C. (reflux temperature being preferred) for a time sufficient to substantially react most of the substituted phenol and the aldehyde and produce a desired pre-alkylated novolac product. Times of from about 20 to 140 minutes are typical.

At the time when such a mixture is reacted with phenol as indicated, there can be present as diluents inert (e.g. as respects reactivity towards components of such mixture and phenol under Friedel-Crafts reaction conditions) organic compounds, such as aromatic and aliphatic hydrocarbons. While there is no apparent upper limit on the amount of diluent which may be present, it is preferred that the amount of diluent present be limited to about 50 weight percent (same basis). Preferably, the amount of diluent ranges from about 2 to 10 weight percent.

By the phrase "when in a form substantially free of other materials" reference is had to a mixture (e.g. of starting materials, of product, or the like, as the case may be) which is substantially free (e.g. on an analytical or theoretical basis) of substances (like inerts as respects reactivity with phenol under Friedel-Crafts catalysis) other than such mixture itself. For example, the afore-indicated starting mixture of diene codimers could have an inert hydrocarbon diluent admixed therewith such as benzene, lower alkyl substituted benzenes, naphthalenes and alkane hydrocarbons containing from 6 through 10 carbon atoms per molecule.

The term "cyclopentadiene" as used herein refers to the cyclic compound having the structure:

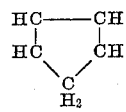

The term "dicyclopentadiene" as used herein refers to the cyclic compound having the structure:

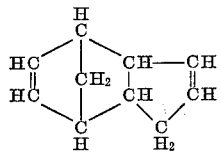

The term "vinylidene" as used herein has generic reference both to vinylidene radicals ($CH_2$=C), and vinyl radicals ($CH_2$=CH— or —CH=CH—; observe that in carboxylic compound mixtures used in this invention having a phenyl group substituted by a vinylidene group, alpha-methyl substitution is included in this definition, as well as styrene, methyl styrene, and ethyl styrene.

All solids herein are conveniently measured using ASTM Test Procedure No. D–115–55.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, suitable such mixtures are shown in the following Tables I–III. In Table I is shown an example of such a mixture available commercially under the trade designation "Dicyclopentadiene Concentrate" from the Monsanto Company, St. Louis, Mo.; in Table II, one available commercially under the trade designation "Resin Former P" from Hess Oil and Chemical Co. of New York, N.Y. and in Table III, one available commercially under the trade designation "Dicyclopentadiene" from Union Carbide Company, New York, N.Y. and also one available commercially under the trade designation "Dicyclopentadiene" from Eastman Kodak Company, Rochester, N.Y.

TABLE I

| Component [1] | Total estimate weight, approximate percent [2] | Adjusted relative approximate weight [3] |
|---|---|---|
| A Dicyclopentadiene compounds: | | |
| 1 Dicyclopentadiene | 72.1 | 77.1 |
| 2 Codimers of cyclopentadiene and methylcyclopentadiene | 0.4 | 0.4 |
| B Cyclopentadiene/alkadiene (Codimers of cyclopentadiene and acyclic conjugated alkadienes containing from 4 through 6 carbon atoms per molecule [4] | 18.6 | 19.8 |
| C Conjugated alkadienes (cyclic and acyclic conjugated alkadienes containing 5 and 6 carbon atoms per molecule [5] | 2.2 | 2.3 |
| D Alkenes; 1 Cyclopentene | 0.4 | 0.4 |
| Total of (A), (B), (C), and (D) | 93.7 | 100.0 |
| E Inert hydrocarbon diluents (total) | 6.3 | |
| 1 Benzene | 0.9 | |
| 2 Methylpentane, methylcyclopentane, and hexane | 5.4 | |

[1] Data in Table I derived from vapor-liquid-phase chromatography mass spectrometry.
[2] Based on total weight of diene dimer compounds and other components including diluents.
[3] Diene codimer compound mixture when in a form substantially free of other materials wherein the sum of all component compounds in any given such mixture equals substantially 100 weight percent.
[4] These alkadienes are usually piperylene and isoprene; composition of such alkadienes is somewhat variable.
[5] These alkadienes are usually piperylene, isoprene and cyclopentadiene; composition of such alkadienes is somewhat variable.

TABLE II

| COMPONENT | Total weight percent basis [1] | Weight percent diene codimer mixture components only [2] |
|---|---|---|
| Arylcycloalkenes: | 1.7 | 1.9 |
| Indene | 1.7 | 1.9 |
| Dicyclopentadienes | 65.5 | 74.1 |
| Dicyclopentadiene | 48.9 | 55.3 |
| Methyldicyclopentadiene | 15.2 | 17.2 |
| Dimethyldicyclopentadiene | 1.4 | 1.6 |
| Cyclopentadiene/alkadiene Codimers | 8.0 | 9.1 |
| Codimers of cyclopentadiene with acyclic conjugated alkadienes having from 4 through 6 carbon atoms per molecule: | | |
| Codimer with butadiene | 6.0 | 6.8 |
| Codimer with isoprene | 2.0 | 2.3 |
| Arylalkenes: | 6.9 | 7.7 |
| Styrene | 5.6 | 6.3 |
| Alphamethylstyrene | 1.3 | 1.4 |
| Trimers incorporating cyclopentadiene, methylcyclopentadiene or conjugated alkadienes having from 4 through 6 carbon atoms per molecule [3] | 6.4 | 7.2 |
| Diene codimer mixture subtotal | 88.5 | 100.0 |
| Unidentified Components | 3.1 | |
| Inert diluents: | 9.4 | |
| Benzene | 0.1 | |
| Toluene | 3.7 | |
| Xylene and ethylbenzene | 5.1 | |
| Naphthalene | 0.5 | |

[1] These values derived using a combination of vapor liquid phase chromatography and mass spectrometry.
[2] When in a form substantially free of other materials wherein the sum of all component compounds of any given such mixture equals substantially 100 weight percent.
[3] Optionally, a diene codimer compound mixture for use in the present invention can contain from about 0 to 8 percent of such trimers.

TABLE III

| COMPONENT | Union Carbide (weight percent) [1] | Eastman Kodak (weight percent) [1] |
|---|---|---|
| Dicyclopentadienes | 93.2 | 95.6 |
| Methyldicyclopentadienes | 3.0 | 0.9 |
| Cyclopentadiene/acyclic conjugated diene codimers | 2.5 | 1.9 |
| Heavy ends [2] | 0.2 | 0.6 |
| Unidentified | 1.1 | 1.0 |

[1] These values derived using a combination of vapor liquid phase chromatography and mass spectrometry.
[2] Heavy ends here comprise primarily trimers of such components as cyclopentadiene, methylcyclopentadiene, and conjugated alkadienes containing from 4 through 6 carbon atoms per molecule. Typically, these heavy ends are reactive with phenol under Friedel-Crafts conditions as taught herein.

To react phenol or novolac as indicated with such an aforedescribed cyclopentadiene codimer compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol or novolac and suitable Friedel-Crafts acid catalyst are mixed, brought to the proper temperature and the cyclopentadiene codimer compound mixture metered into the acidified (or catalyzed) phenol.

For purposes of this invention, the reaction of a cyclopentadiene codimer compound mixture with phenol or novolac as indicated is preferably carried out under Friedel-Crafts conditions at temperatures in the range of from about 25 to 200° C. although higher and lower temperatures can be used. Also, the reaction is preferably conducted under liquid phase conditions at or below atmospheric pressures, although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted cyclopentadiene codimer compound mixture using, for example, vapor phase chromatography.

Friedel-Crafts catalysts which may be used in place of aluminum chloride, or together with aluminum chloride, include:

(a) Other inorganic halides, such as gallium, titanium, antimony and zinc halides (including $ZnCl_2$);

(b) Inorganic acids, such as sulphuric, phosphoric and the hydrogen halides (including HF);

(c) Activated clays, silica gel and alumina, (d) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid, and the like, or with inorganic acids, such as phosphoric acid, sulfuric acid, and the like, and (e) Alkyl, aryl and aralkyl sulfonic acids, such as ethane sulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, -naphthalene sulfonic acid, and the like.

When $BF_3$, as such, is employed, it is conveniently fed to a reaction mixture in gaseous form.

While any combination of cyclopentadiene codimer compound starting mixture, phenol (or novolac as indicated), and catalyst can be used, it is particularly convenient to react the cyclopentadiene codimer compound mixture in the presence of less than about 10 weight percent (based on the phenol) of acid catalyst.

The reaction mass of cyclopentadiene codimer compound mixture, phenol (or novolac as indicated), and catalyst is heated to a temperature in the range of from about 25 to 200° C. The rate of this reaction is dependent, to some degree, on the temperature employed. In general, the reaction is rapid, and a complete reaction between phenol and cyclopentadiene codimer compound mixture is preferred. Generally, a heating time of from about 10 minutes to 4 hours is employed. The various process variables are summarized in Table IV below:

TABLE IV

| Process variable | Broad range | Preferred range |
| --- | --- | --- |
| Temperature (° C.) | About 25-200 | About 60-140. |
| Reaction time | Less than about 4 hours. | About 10-30 minutes. |
| Catalyst (based on phenol or novolac) weight percent. | Less than about 10. | About 0.1-1.0. |
| Inert hydrocarbon diluent (based on total weight cyclopentadiene codimer compound mixture and diluent) weight percent. | Up to about 50 | About 2-10. |
| Total cyclopentadiene codimer compound mixture (based on 100 parts by weight phenol or novolac) parts by weight. | About 5-100 | About 20-80. |

[1] On a 100 weight percent basis when in a form substantially free of other materials.

The properties of a given so-substituted phenol or novolac are affected by the process conditions used to make that product (e.g., molecular weight distribution, color and the like). The resulting reaction product is, as those skilled in the art will appreciate, a complex mixture of various different substituted products from the reaction of phenol or novolac under Friedel-Crafts conditions with the cyclopentadiene codimer compound starting mixture to produce phenolic portions which are substituted both on the ring carbon atoms and on phenol hydroxyl oxygen atoms by moieties derived from such cyclopentadiene codimer compound.

It will be appreciated that the aldehyde to phenol ratios herein described have reference to the total amount of phenol present before a reaction, including the phenol which is substituted by the cyclopentadiene codimer compound mixture, as described above.

The etherifying agent which introduces the epoxy groups into the above modified phenol-aldehyde novolacs is a haloepoxyalkane or a compound which produces a haloepoxyalkane under the reaction conditions. A haloepoxyalkane has the formula:

(1) 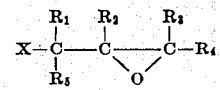

where X is a halogen atom, for instance, chlorine or bromine, and $R_1$, $R_2$, $R_3$, $R_4$ and $R_5$ are each individually hydrogen or an alkyl group of less than 6 carbon atoms. The preferred haloepoxyalkane is epichlorohydrin. Compounds which produce haloepoxyalkanes under the reaction condtions are for example, the dihalohydrins of which the alpha-and beta-dichlorohydrins and dibromohydrins are preferred.

A suitable etherification procedure for use in the present invention comprises reacting the modified novolac resin with the etherifying agent in an alkaline catalyzed liquid medium at a temperature of from about 50° to 120° C. Conveniently, one uses a mole ratio of etherifying agent to modified novolac resin of from about 2.5 to 10 (preferably about 3 to 6). The etherification reaction proceeds according to the following scheme:

(2) 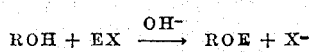

where ROH represents the phenol groups of the novolac resin, EX represents an etherifying agent of Formula 1 and OH⁻ represents the alkali. Any convenient alkaline catalyst may be used. For example, preferred alkaline catalysts are alkali metal hydroxides, such as sodium or potassium hydroxide.

To produce the etherified product ROE (referring to Equation 2) involves hydroxyl ions derived from the alkali, so consequently, the liquid employed contains water, as those skilled in the art will appreciate, in order to allow the formation of such ions to occur. For optimum results the amount of water present in the reaction mixture should not greatly exceed the minimum amount of water necessary to bring about the etherification reaction. It has been found that the excess quantities of water tend to react with the etherifying agent which is wasteful of the agent and may, in fact, lead to the production of etherified products having low degrees of etherification.

The preferred etherification procedure comprises mixing, with warming and dispersion, the cyclopentadiene codimer alkylated novolac resin with the etherifying agent, the latter being used in a considerable excess. The temperature of reaction is typically within the range of 60 to 100° C. A portion of the alkali required together with the requisite quantity of water is then added to this mixture which is held under reflux conditions and the remainder of the alkali necessary to complete the reaction is added in small portions.

After the caustic addition is complete the reaction mixture can be refluxed for an additional period of time up to several hours while maintaining the increased temperature conditions as necessary to complete the reaction. At the end of this additional reflux period the excess etherification agent and water are removed, typically by vacuum stripping.

As will be seen from the above scheme, the amount of alkali present in this type of etherification process should be at least chemically equivalent to the number of phenolic hydroxyl groups it is desired to etherify and preferably a slight excess of alkali on this amount should be employed. It is also advantageous to employ an excess of the etherifying agent. When a compound such as alpha- or beta-dichlorohydrin is used as the etherifying agent, a higher production of alkali is required to neutralize any acid evolved in the formation of the epoxy groups.

The reaction mixture in which the above-mentioned preferred etherification procedure is carried out is typically agitated during the reaction to maintain good contact between the various reacting components therein. This agitation is brought about either by mechanical means or by maintaining the reaction mixture under reflux conditions. When this procedure is adopted it is necessary to have excess etherifying agent present which may be refluxed or, preferably, to add an inert diluent or solvent for the modified novolac resin to the reaction mixture such inert diluent or solvent having a suitable boiling point so that the reaction may be carried out under reflux. It is also advantageous to carry out the etherification reaction in the presence of excess etherifying agent and in some instances an inert diluent because such a procedure reduces this undesirable possibility that the epoxy groups of the newly formed epoxy resins may interact with unetherified phenolic hydroxyl groups.

In accordance with this invention, at this point in the reaction substantially all of the ether halohydrin groups which have replaced the phenol-hydroxyl groups of the cyclo pentadiene codimer substituted phenol-aldehyde resin have been transformed i.e. a dehydrohalogenation reaction, to glycidal ether groups of the formula:

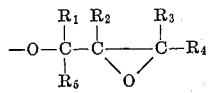

where $R_1$, $R_2$, $R_3$, $R_4$ and $R_5$ are each individually hydrogen or an alkyl group of less than 6 carbon atoms. Preferably each R is hydrogen. The product epoxy resin has an oxirane oxygen content of at least about 1 weight percent and an average epoxide equivalent weight of characteristically from about 180 to 300.

If it is desired to further dehydrohalogenate the etherified novolac, there may be added to the resulting mixture a quantity of organic diluent sufficient to bring the solids level below 70% total weight basis (approximately corresponding by parts to the novolac originally charged). Caustic solution may then be charged to the solution and the mixture again refluxed for a period of up to several hours at a temperature of about 80–100° C. At the end of the additional reflux period the pH of the reaction mixture is made acidic using phosphoric acid. At this point the water may be azeotropically removed using toluene.

When the reaction is completed, the salt formed in the reaction is typically removed by filtration or centrifugation and therefore, in order to cause the precipitation of the salt, the quantity of water in the reaction mixture should be maintained as small as possible. To accomplish the removal of the salt a filtration aid may be added to the solution followed by pressure filtration to give a salt free varnish system.

The epoxy resins of the present invention may be cured with the aid of curing agents such as amines, polyamines amides, carboxylic acids, and carboxylic acid anhydrides. Examples of typical curing agents are methylenedianiline, methyl nadic anhydride, 4,4'-diaminodiphenylsulfone, triethylene tetramine, and dicyandiamide. The present resins find many uses, for instance as surface coating or laminating compounds, adhesives or molding compositions.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

PRE-ALKYLATED NOVOLAC RESINS

Example A 100 parts of phenol and 0.5 part concentrated sulfuric acid are charged to a suitable reaction vessel and heated to 125° C. 20 parts of cyclopentadiene codimer compound mixture available commercially as "Dicyclopentadiene Concentrate" from Monsanto Company (described above) are added to the mixture over a period of 45 minutes while keeping the temperature at 120–130° C. The temperature of the mixture is held between 120–130° C. after addition of cyclopentadiene codimer compound mixture for 30 minutes, then adjusted to 95° C. Dropwise, there is added 38 parts 50% Formalin at such a rate so that the reaction exotherm is controlled and a uniform atmospheric boil is initiated. After addition of Formalin is complete, the reaction mixture is heated at atmospheric reflux (100° C.) for 1 hour. Then this product mixture is dehydrated under vacuum to an end point of about 130° C. at 28" Hg vacuum. The product is drained from the reaction vessel while hot and fluid and then allowed to solidify. The product novolac resin is a dark, tacky semi-solid at room temperature and pressures.

Example B

The procedure of Example A is repeated except that 40 parts of a different cyclopentadiene codimer compound mixture are used. The cyclopentadiene codimer compound mixture comprises, when in a form substantially free of other materials wherein the sum of all component compounds of any given such mixture equals substantially 100 weight percent, about 70 weight percent dicyclopentadiene, about 28 weight percent of codimers of cyclopentadiene with butadiene and isoprene (50/50) and about 2 weight percent of 50/50 1-pentene and 1-hexene mix. This mixture additionally contains about 10 weight percent toluene as an inert diluent.

Example C

The procedure of Example A is repeated except that 80 parts of the following cyclopentadiene codimer compound mixture are used: (when in a form substantially free of other materials wherein the sum of all component compounds of any given such mixture equals substantially 100 weight percent) about 90 weight percent of dicyclopentadiene, about 8 percent by weight of codimers of cyclopentadiene with butadiene and isoprene (50/50) and about 2 weight percent of 50/50 1-pentene and 1-hexene mix. This mixture additionally contains about 10 weight percent toluene as an inert diluent.

Example D

The procedure of Example A is repeated except that here 40 parts are used of a cyclopentadiene codimer compound mixture comprising, when in a form substantially free of other materials wherein the sum of all component compounds of any such given mixture equals substantially 100 weight percent, about 80 weight percent dicyclopentadiene, about 5 weight percent of codimers of cyclopentadiene with butadiene and isoprene (50/50), and about 15 percent by weight of 50/50 1-pentene and 1-hexene mix. This mixture additionally contains about 10 weight percent toluene as an inert diluent.

Example E 100 parts of phenol and 0.5 part BF$_3$ etherate complex are charged to a suitable reaction vessel and heated to 125° C. To this are added 50 parts of the cyclopentadiene codimer compound mixture available commercially as "Resin Former P" from the Hess Oil and Chemical Co. and having a composition as described above in Table II, over a period of 45 minutes while keeping the temperature at 120–130° C. The temperature of the mixture is held at about 125° C. after addition of such diene codimer mixture for 30 minutes, then adjusted to 95° C.; then 0.8 parts of oxalic acid dihydrate dissolved in water are charged. Dropwise, there is now added 32 parts 50% Formalin at such a rate that the reaction exotherm is controlled and a uniform atmospheric boil is initiated. After addition of Formalin is complete, the reaction mixture is heated at atmospheric reflux (100° C.) for 1 hour. Then the product is dehydrated under vacuum to an end point of 130° C. at 28" Hg vacuum. The product is drained from the reaction vessel while hot and fluid and allowed to solidify. The product is a tacky semisolid.

Example F

The procedure of Example E is repeated except that here 10 parts are used of a cyclopentadiene codimer compound mixture comprising, when in a form substantially free of other materials wherein the sum of all component compounds of any given such mixture equals substantially 100 weight percent, about 5 weight percent of indene, about 70 weight percent of dicyclopentadiene, about 5 weight percent of codimers of cyclopentadiene with butadiene and isoprene (50/50) and about 20 weight percent styrene. This diene codimer mixture additionally contains about 10 weight percent toluene as an inert diluent.

Example G

The procedure of Example E is repeated except that here 30 parts are used of a cyclopentadiene codimer compound mixture comprising, when in a form substantially free of other materials wherein the sum of all component compounds of any given such mixture equals substantially 100 weight percent, about 10 weight percent of indene, about 50 weight percent dicyclopentadiene, about 10 weight percent of codimers of cyclopentadiene with butadiene and isoprene (50/50) and about 30 weight percent styrene. The diene codimer compound mixture additionally contains about 10 weight percent toluene as an inert diluent.

Example H

The procedure of Example E is repeated except that here 40 parts are used of a cyclopentadiene codimer compound mixture comprising, when in a form substantially free of other materials wherein the sum of all component compounds of any such given mixture equals substantially 100 weight percent, about 5 percent by weight indene, about 85 percent by weight dicyclopentadiene, about 5 weight percent of codimers of cyclopentadiene with butadiene and isoprene (50/50) and about 5 weight percent of styrene. This diene codimer compound mixture additionally contains about 10 weight percent toluene as an inert diluent.

Example I

The procedure of Example A is repeated except that here toluene sulfonic acid (0.5 part) is used in place of the sulfuric acid as catalyst, and as the diene codimer compound mixture there is used 20 part of a mixture commercially available from Eastman Chemical Company under the trade designation "Dicyclopentadiene" and having a composition as described in Table III above.

Example J

The procedure of Example A is repeated except that here 40 parts are used of a cyclopentadiene codimer compound mixture comprising, when in a form substantially free of other materials wherein the sum of all component compounds of any such given mixture equals substantially 100 weight percent, about 91 weight percent dicyclopentadiene, and about 5 weight percent of codimers of cyclopentadiene with butadiene and isoprene (50/50), and about 4 weight percent of a codimer of cyclopentadiene with a methyl cyclopentadiene. This diene codimer mixture additionally contains about 10 percent by weight toluene as an inert diluent.

Example K

The procedure of Example A is repeated except that here 50 parts are used of a cyclopentadiene codimer compound mixture commercially available under the trade designation "Dicyclopentadiene" from Union Carbide Co. having a composition as described in Table III above.

POST-ALKYLATED NOVOLAC RESINS

Example L 100 parts of phenol and 0.5 part concentrated sulfuric acid are charged to a suitable reaction vessel and heated to 95° C. Dropwise, there is added 38 parts of 50% Formalin at such a rate so that the reaction exotherm is controlled and a uniform atmospheric boil is initiated. After addition of the Formalin is complete, the reaction mixture is heated at atmospheric reflux (100° C.) for 1 hour. Then this intermediate mixture is dehydrated under vacuum to an end point of about 115° C. at 10″ Hg vacuum. To this intermediate resin is added 20 parts of cyclopentadiene codimer compound mixture used in Example A above over a period of 30 minutes while keeping the temperature at 115–125° C. The temperature of the mixture is held between 115 and 125° C. for 30 minutes after the addition of the diene codimer compound mixture is complete. This product is desolvated under vacuum to an end point at about 130° C. at 28″ Hg vacuum. The product is drained from the reaction vessel while hot and fluid and then allowed to solidify. The product novolac resin is a dark, tacky semisolid at room temperature and pressures.

Example M

The procedure of Example L is repeated except that here 40 parts of the cyclopentadiene codimer compound mixture of Example B are reacted with the preformed novolac.

Example N

The procedure of Example L is repeated except that here 80 parts of the cyclopentadiene codimer compound mixture of Example C are reacted with the preformed novolac.

Example O

The procedure of Example L is repeated except that here 40 parts of the cyclopentadiene codimer compound mixture of Example D is reacted with the preformed novolac.

Example P 100 parts of phenol, 38 parts of 50% Formalin and 0.8 part of oxalic acid dihydrate are charged to a suitable reaction vessel and heated to an atmospheric boil. The reaction mixture is heated at atmospheric reflux (100° C.) for 2 hours. After 2 hours of reflux, 0.2 parts of 98% $H_2SO_4$, diluted in water, is added to the reaction mixture. Then this intermediate mixture is dehydrated under vacuum to an end point of about 115° C. at 10″ Hg vacuum. To this intermediate resin is added 80 parts of cyclopentadiene codimer compound mixture used in Example E above ("Resin Former P" sold by Hess Oil and Chemical Co.) over a period of 30 minutes while keeping the temperature at 115–125° C. The temperature of the mixture is held between 115 and 125° C. after addition of the diene codimer compound for 30 minutes. This product mixture is dehydrated under vacuum to an end point of about 130° C. at 28″ Hg vacuum. The product is drained from the reaction vessel while hot and fluid and then allowed to solidify. The product is a tacky semisolid.

Example Q

The procedure of Example P is repeated except that here 10 parts of the cyclopentadiene codimer compound mixture of Example F is reacted with the preformed novolac.

Example R

The procedure of Example P is repeated except that here 20 parts of the cyclopentadiene codimer compound mixture of Example G is reacted with the preformed novolac.

Example S

The procedure of Example P is repeated except that here 50 parts of the cyclopentadiene codimer compound mixture of Example H is reacted with the preformed novolac.

Example T 100 parts of phenol, 32 parts of 50% Formalin and 0.8 part of oxalic acid dihydrate are charged to a suitable reaction vessel and heated to atmospheric boil. The reaction mixture is heated at atmospheric reflux (100° C.) for 2 hours. Then this intermediate resin mixture is dehydrated under vacuum to an end point of about 105° C. at 10" Hg vacuum. Boron trifluoride etherate (0.5 part) is diluted with an equal portion of toluene and added to the reaction vessel. The temperature is adjusted to 115° C. To this intermediate resin is added 60 parts of the cyclopentadiene codimer compound mixture used in Example I above ("Dicyclopentadiene" sold by Eastman Chemical Co.) over a period of 30 minutes while keeping the temperature at 115–125° C. The temperature of the mixture is held between 115 and 125° C. for 30 minutes after the addition of the diene codimer mixture is complete. This product mixture is desolvated under vacuum to an end point of about 150° C. at 28" Hg vacuum. The product is drained from the reaction vessel while hot and fluid and then allowed to solidify.

Example U

The procedure of Example T is repeated except that here 30 parts of the cyclopentadiene codimer compound mixture of Example K ("Dicyclopentadiene" sold by Union Carbide Co.) is reacted with the preformed novolac.

Example V

The procedure of Example T is repeated except that here 40 parts of the cyclopentadiene codimer compound mixture of Example J is reacted with the preformed novolac.

The product obtained in each of the above lettered examples is a cyclopentadiene codimer substituted novolac resin which is to be further reacted with an etherifying agent, as described in the numbered examples that follow, to form the epoxy novolac resins of this invention.

EXAMPLE 1

100 parts of the cyclopentadiene codimer compound substituted novolac obtained according to Example A is dissolved in 400 parts epichlorhydrin and the temperature raised to 60–100° C. with reflux control. 3 to 5 parts of water are added initially. To this homogeneous solution 66 parts of 50% sodium hydroxide is added slowly over a period of 1 to 2 hours with continuous azeotropic removal of water. After completion of the caustic addition, the reaction mixture is refluxed for ½ to 1 hour at atmospheric pressure. Excess epichlorohydrin and water are then removed by vacuum stripping to an end point at 140° C. at 28" of Hg.

100 parts of toluene is then added to the reaction mixture with cooling to bring the temperature below 100° C. Six parts of 50% solution of sodium hydroxide is added, and the mixture again refluxed for 1–2 hours. At the end of this period, the pH of the reaction solution is brought below 7.0 by using phosphoric acid. Water is again azeotropically removed, followed by filtration of the salt formed by reaction to give a salt free varnish system. The average epoxide equivalent weight of the resulting epoxy novolac is about 200.

Examples 2–22

The foregoing procedure is repeated using as starting materials the various cyclopentadiene codimer compound substituted novolacs prepared according to Examples A–V. The results for all examples are summarized in Table V.

TABLE V.—REACTANT (PARTS)

| Example: | Starting material, example | Cyclopentadiene codimer substituted novolac | Epichlorhydrin | Total NaOH (50% solution) | Average epoxide equivalent weight |
|---|---|---|---|---|---|
| 1 | A | 100 | 100 | 72 | 200 |
| 2 | B | 100 | 356 | 64 | 215 |
| 3 | C | 100 | 295 | 54 | 235 |
| 4 | D | 100 | 353 | 64 | 220 |
| 5 | E | 100 | 345 | 62 | 210 |
| 6 | F | 100 | 420 | 76 | 192 |
| 7 | G | 100 | 400 | 72 | 199 |
| 8 | H | 100 | 356 | 64 | 215 |
| 9 | I | 100 | 295 | 54 | 240 |
| 10 | J | 100 | 353 | 64 | 220 |
| 11 | K | 100 | 375 | 64 | 228 |
| 12 | L | 100 | 345 | 62 | 208 |
| 13 | M | 100 | 420 | 76 | 192 |
| 14 | N | 100 | 450 | 70 | 245 |
| 15 | O | 100 | 375 | 64 | 215 |
| 16 | P | 100 | 400 | 55 | 240 |
| 17 | Q | 100 | 300 | 75 | 201 |
| 18 | R | 100 | 352 | 54 | 220 |
| 19 | S | 100 | 360 | 64 | 210 |
| 20 | T | 100 | 380 | 60 | 216 |
| 21 | U | 100 | 400 | 72 | 197 |
| 22 | V | 100 | 425 | 65 | 225 |

Each of the epoxy resins of Examples 1 to 22 has substantially all of its phenol-hydroxy groups replaced with the glycidyl ether group of the formula:

$$-O-CH_2-CH\overset{\displaystyle O}{\underset{\displaystyle}{-}}CH_2$$

and has an oxirane oxygen content of at least about 1 weight percent. Each product epoxy resin is soluble in a wide variety of organic solvents (for example, acetone, toluene, methyl ethyl ketone, methyl isobutyl ketone, butanol, dimethyl ether of ethylene glycol, benzene). In addition, these products display excellent impact and flexural strength characteristics when thermoset by heat alone at elevated temperatures, preferably in excess of about 180° F. (as shown by the Izod Impact Test and ASTM flexural strength test procedure).

What is claimed is:

1. An epoxy resin having an oxirane oxygen content of at least about 1 weight percent and an average epoxide equivalent weight of from about 180 to 300, said resin having been made by reacting under alkaline liquid phase conditions a haloepoxyalkane of the formula:

$$X-\underset{\underset{R_5}{|}}{\overset{\overset{R_1}{|}}{C}}-\underset{\underset{}{|}}{\overset{\overset{R_2}{|}}{C}}\overset{\displaystyle O}{\underset{\displaystyle}{-}}\overset{\overset{R_3}{|}}{C}-R_4$$

where X is halogen; and $R_1$, $R_2$, $R_3$, $R_4$, and $R_5$ are each individually selected from the group consisting of hydrogen and alkyl radicals containing less than 6 carbon atoms each; with a phenol-aldehyde novolac resin having a number average molecular weight of from about 200 to 600, said phenolaldehyde resin having had its phenol portion reacted under Friedel-Crafts conditions with a mixture of cyclopentadiene codimer compounds which comprises (on a 100 weight percent basis when in a form substantially free of other materials):
(A) from about 1.5 to 10 weight percent of compounds each molecule of which has:
(1) the indene nucleus,
(2) from 9 through 13 carbon atoms,
(3) as nuclear substituents from 0 through 4 methyl groups,
(B) from about 50 to 70 weight percent of compounds each molecule of which has:
(1) the dicyclopentadiene nucleus,
(2) from about 10 through 13 carbon atoms,
(3) as nuclear substituents from 0 through 3 methyl groups,
(C) from about 4 to 10 weight percent of compounds each molecule of which is a codimer of cyclopentadiene with at least one acyclic conjugated alkadiene having from 4 through 6 carbon atoms per molecule, and
(D) from about 4 to 30 weight percent of compounds each molecule of which has:
(1) a phenyl group substituted by a vinylidene group,
(2) from 8 through 13 carbon atoms,
(3) as substituents from 0 through 3 groups selected from the class consisting of methyl and ethyl.

2. The epoxy resin of claim 1 wherein the cyclopentadiene codimer substituted phenol-aldehyde resin is characterized by a molar ratio of aldehyde to phenol of from mixture to phenol of from 0.2:1.0 to 0.8:1.0.

3. The epoxy resin of claim 1 wherein the cyclopentadiene codimer substituted phenol-aldehyde resin is characterized by a molar ratio of aldehyde to phenol of from 0.5:1 to 0.85:1.

4. An epoxy resin having an oxirane oxygen content of at least about 1 percent and an average epoxide equivalent weight of from about 180 to 300, said resin having been made by reacting under alkaline liquid phase conditions epichlorohydrin with a phenol-aldehyde resin having a number average molecular weight of from about 200 to 600 and a molar ratio of aldehyde to phenol of from about 0.5:1 to 0.85 to 1, said phenol-aldehyde novolac resin having had its phenol portion reacted under Friedel-Crafts conditions with from about 20 to 80 parts by weight per 100 parts of phenol of a mixture of cyclopentadiene codimer compounds which comprises (on a 100 weight percent basis when in a form substantially free of other materials):
(A) from about 1.5 to 10 weight percent of compounds each molecule of which has:
(1) the indene nucleus,
(2) from 9 through 13 carbon atoms,
(3) as nuclear substituents from 0 through 4 methyl groups,
(B) from about 50 to 70 weight percent of compounds each molecule of which has:
(1) the dicyclopentadiene nucleus,
(2) from about 10 through 13 carbon atoms,
(3) as nuclear substituents from 0 through 3 methyl groups,
(C) from about 4 to 10 weight percent of compounds each molecule of which is a codimer of cyclopentadiene with at least one acyclic conjugated alkadiene having from 4 through 6 carbon atoms per molecule, and
(D) from about 4 to 30 weight percent of compounds each molecule of which has:
(1) a phenyl group substituted by a vinylidene group,
(2) from 8 through 13 carbon atoms,
(3) as substitutents from 0 through 3 groups selected from the class consisting of methyl and ethyl.

5. The epoxy resin of claim 4 wherein the carboxylic substituted phenol-aldehyde resin is pre-substituted with said mixture of diene codimer compounds.

6. The epoxy resin of claim 4 wherein the carboxylic substituted phenol-aldehyde resin is post-substituted with said mixture of diene codimer compounds.

7. In a process for making an epoxy resin, the improvement which comprises the step of:
contacting under alkaline aqueous liquid phase conditions a haloepoxyalkane of the formula:

$$X-\underset{R_5}{\overset{R_1}{C}}-\underset{}{\overset{R_2}{C}}-\underset{O}{\overset{R_3}{C}}-R_4$$

where X is a halogen; and $R_1$, $R_2$, $R_3$, $R_4$, and $R_5$ are each individually selected from the group consisting of hydrogen and alkyl radicals containing less than 6 carbon atoms each; with a phenol-aldehyde novolac resin, having a number average molecular weight of from about 200 to 600 and having been made by reacting its phenol portion under Friedel-Crafts conditions with a mixture of cyclopentadiene codimer compounds which comprises (on a 100 weight percent basis when in a form substantially free of other materials);
(A) from about 1.5 to 10 weight percent of compounds each molecule of which has:
(1) the indene nucleus,
(2) from 9 through 13 carbon atoms,
(3) as nuclear substituents from 0 through 4 methyl groups,
(B) from about 50 to 70 weight percent of compounds each molecule of which has:
(1) the dicyclopentadiene nucleus,
(2) from about 10 through 13 carbon atoms,
(3) as nuclear substituents from 0 through 3 methyl groups,
(C) from about 4 to 10 weight percent of compounds each molecule of which is a codimer of cyclopentadiene with at least one acyclic conjugated alkadiene having from 4 through 6 carbon atoms per molecule, and
(D) from about 4 to 30 weight percent of compounds each molecule of which has:
(1) a phenyl group substituted by a vinylidene group,
(2) from 8 through 13 carbon atoms,
(3) as substitutents from 0 through 3 groups selected from the class consisting of methyl and ethyl.

8. The process of claim 7 further comprising adding at least a sufficient amount of organic inert diluent to the product so produced to bring the total resin solids content of the resulting mixture below about 70 percent (total weight basis), and thereafter adding at least sufficient amounts of an aqueous solution of an alkali metal hydroxide to the resulting mixture so as to substantially complete dehydrohalogenation of the epoxy novolac while maintaining a pH greater than about 7.0 and a temperature of least than about 100° C.

9. A varnish comprising a solution of from about 30 to 80 parts by weight of the epoxy resin of claim 1 dissolved in an inert hydrocarbon solvent, the balance of up to 100 parts by weight of such varnish comprising said hydrocarbon solvent.

10. The epoxy resin of claim 1 having been thermoset by heating at an elevated temperature.

References Cited

UNITED STATES PATENTS

| | | | |
|---|---|---|---|
| 2,388,584 | 12/1945 | Ward | 260—619 |
| 2,460,724 | 2/1949 | Allen et al. | 260—57X |
| 2,859,205 | 11/1958 | Lection | 260—51 |
| 2,897,175 | 7/1959 | Howe et al. | 260—58 |

FOREIGN PATENTS

| | | | |
|---|---|---|---|
| 774,582 | 5/1957 | Great Britain | 260—51 |

WILLIAM H. SHORT, Primary Examiner

H. SCHAIN, Assistant Examiner

U.S. Cl. X.R.

260—32,8, 33.2, 33.4, 53, 59